United States Patent
Zhang et al.

(10) Patent No.: US 9,332,323 B2
(45) Date of Patent: May 3, 2016

(54) METHOD AND APPARATUS FOR IMPLEMENTING A MULTI-DIMENSIONAL OPTICAL CIRCUIT SWITCHING FABRIC

(71) Applicant: Sodero Networks, Inc., Cranbury, NJ (US)

(72) Inventors: Yueping Zhang, Princeton, NJ (US); Lei Xu, Princeton Junction, NJ (US)

(73) Assignee: Guohua Liu, Chino Hills, CA (US)

( * ) Notice: Subject to any disclaimer, the term of this patent is extended or adjusted under 35 U.S.C. 154(b) by 0 days.

(21) Appl. No.: 14/057,133

(22) Filed: Oct. 18, 2013

(65) Prior Publication Data

US 2014/0119728 A1    May 1, 2014

Related U.S. Application Data

(60) Provisional application No. 61/719,026, filed on Oct. 26, 2012.

(51) Int. Cl.
*H04J 14/00* (2006.01)
*G02B 6/26* (2006.01)
(Continued)

(52) U.S. Cl.
CPC .......... *H04Q 11/0005* (2013.01); *G02B 6/3556* (2013.01); *H04J 14/0204* (2013.01); *H04J 14/0205* (2013.01); *H04J 14/0212* (2013.01); *H04J 14/0216* (2013.01); *H04J 14/0217* (2013.01); *H04Q 11/0071* (2013.01); *H04Q 2011/003* (2013.01); *H04Q 2011/006* (2013.01);
(Continued)

(58) Field of Classification Search
CPC ... H04J 14/02; H04J 14/0212; H04J 14/0204; H04J 14/0216; H04J 14/0217; H04J 14/0205; H04Q 11/00; H04Q 11/0071; H04Q 14/0217; H04Q 14/0204; H04Q 2011/0052; H04Q 2011/0015; H04Q 2011/0016; H04Q 11/0005; H04Q 2011/003; H04Q 2011/0035; G02B 6/3556; G02B 6/35
USPC ........................................ 398/48, 45; 385/17
See application file for complete search history.

(56) References Cited

U.S. PATENT DOCUMENTS

| | | | | |
|---|---|---|---|---|
| 5,550,818 A | * | 8/1996 | Brackett | H04J 3/085 359/341.2 |
| 7,006,767 B1 | * | 2/2006 | Frigo | H04J 14/0227 398/30 |

(Continued)

OTHER PUBLICATIONS

A. Singla, A. Singh, K. Ramachandran, L. Xu, and Y. Zhang, "Proteus: a topology malleable data center network," in Proc. Ninth ACM SIG-COMM Workshop on Hot Topics in Networks, ser. Hotnets '10, 2010, pp. 9:1-8:6.*

(Continued)

*Primary Examiner* — Ken N Vanderpuye
*Assistant Examiner* — Abbas H Alagheband
(74) *Attorney, Agent, or Firm* — Panitch Schwarze Belisario & Nadel LLP

(57) ABSTRACT

An optical switching system is described. The system includes a plurality of interconnected wavelength selective switching units. Each of the wavelength selective switching units is associated with one or more server racks. The interconnected wavelength selective switching units are arranged into a fixed structure high-dimensional interconnect architecture comprising a plurality of fixed and structured optical links. The optical links are arranged in a k-ary n-cube, ring, mesh, torus, direct binary n-cube, indirect binary n-cube, Omega network or hypercube architecture.

10 Claims, 9 Drawing Sheets

(51) Int. Cl.
*G02B 6/42* (2006.01)
*H04Q 11/00* (2006.01)
*G02B 6/35* (2006.01)
*H04J 14/02* (2006.01)

(52) U.S. Cl.
CPC ............... *H04Q 2011/0015* (2013.01); *H04Q 2011/0016* (2013.01); *H04Q 2011/0035* (2013.01); *H04Q 2011/0052* (2013.01); *H04Q 2011/0054* (2013.01)

(56) References Cited

U.S. PATENT DOCUMENTS

| | | | | |
|---|---|---|---|---|
| 7,184,666 | B1* | 2/2007 | Li | H04J 14/0204 398/81 |
| 7,340,169 | B2* | 3/2008 | Ovadia et al. | 398/57 |
| 7,580,637 | B2* | 8/2009 | El-Ahmadi | H04L 1/0057 398/135 |
| 7,872,990 | B2* | 1/2011 | Guo et al. | 370/254 |
| 8,369,706 | B2* | 2/2013 | Sorin | H04Q 11/0067 398/34 |
| 8,705,954 | B2* | 4/2014 | Singla | H04J 14/0204 398/14 |
| 8,861,968 | B2* | 10/2014 | Zhang | H04J 14/0204 398/83 |
| 9,225,454 | B1 | 12/2015 | Liu | H04J 14/02 |
| 2002/0018260 | A1* | 2/2002 | Kisovec | H04J 14/0204 398/79 |
| 2005/0044195 | A1* | 2/2005 | Westfall | 709/223 |
| 2008/0089693 | A1* | 4/2008 | El-Ahmadi | H04L 1/0057 398/135 |
| 2008/0181605 | A1* | 7/2008 | Palacharla | H04J 14/0204 398/50 |
| 2009/0148163 | A1* | 6/2009 | Frigo | H04J 14/0227 398/59 |
| 2010/0239266 | A1* | 9/2010 | Kash et al. | 398/135 |
| 2010/0260500 | A1* | 10/2010 | Ji et al. | 398/50 |
| 2012/0008943 | A1* | 1/2012 | Singla | H04J 14/0204 398/45 |
| 2012/0008944 | A1* | 1/2012 | Singla | H04J 14/0204 398/45 |
| 2012/0099863 | A1* | 4/2012 | Xu et al. | 398/49 |
| 2012/0114332 | A1* | 5/2012 | Zhang | H04J 14/0204 398/48 |
| 2013/0022352 | A1* | 1/2013 | Yamashita | 398/34 |
| 2013/0108265 | A1* | 5/2013 | Zami et al. | 398/48 |
| 2014/0093211 | A1* | 4/2014 | McColloch et al. | 385/74 |

OTHER PUBLICATIONS

Kachris, Christoforos; Tomkos, I., "A Survey on Optical Interconnects for Data Centers," in Communications Surveys & Tutorials, IEEE, vol. 14, No. 4, pp. 1021-1036, Fourth Quarter 2012, hereinafter Kachris.*

International Search Report and Written Opinion issued Jan. 20, 2014 in International Application No. PCT/US2013/065913, 11 pages.

Christoforos Kachrist et al., "A Survey on Optical Interconnects for Data Centers", IEEE Communications Surveys, IEEE, New York, NY, US, vol. 14, No. 4 dated Oct. 1, 2012, 16 pages.

Lei Xu et al., "Optically interconnected data center networks", Optical Fiber Communication Conference and Exposition (OFC/NFOEC), 2012 and The National Fiber Optic Engineers Conference IEEE, dated Mar. 4, 2012, 3 pages.

Guohui Wang et al., "Programming your network at run-time for big data applications", Hot Topics in Software Defined networks, ACM, 2 Penn Plaza, Suite 701, New York, NY 10121-0701, dated Aug. 13, 2012, 6 pages.

International Preliminary Report on Patetability for PCT/US2013/065913, May 7, 2015, 7 pages.

* cited by examiner

METHOD AND APPARATUS FOR IMPLEMENTING A MULTI-DIMENSIONAL OPTICAL CIRCUIT SWITCHING FABRIC

CROSS-REFERENCE TO RELATED APPLICATIONS

This application claims priority to U.S. Provisional Patent Application No. 61/719,026 filed Oct. 26, 2012, which is incorporated herein by reference.

BACKGROUND OF THE INVENTION

Embodiments of the present invention relate generally to computer network switch design and network management. More particularly, the present invention relates to scalable and self-optimizing optical circuit switching networks, and methods for managing such networks.

Inside traditional data centers, network load has evolved from local traffic (i.e., intra-rack or intra-subnet communications) into global traffic (i.e., all-to-all communications). Global traffic requires high network throughput between any pair of servers. The conventional over-subscribed tree-like architectures of data center networks provide abundant network bandwidth to the local areas of the hierarchical tree, but provide scarce bandwidth to the remote areas. For this reason, such conventional architectures are unsuitable for the characteristics of today's global data center network traffic.

Various next-generation data center network switching fabric and server interconnect architectures have been proposed to address the issue of global traffic. One such proposed architecture is a completely flat network architecture, in which all-to-all non-blocking communication is achieved. That is, all servers can communicate with all the other servers at the line speed, at the same time. Representatives of this design paradigm are the Clos-network based architectures, such as FatTree and VL2. These systems use highly redundant switches and cables to achieve high network throughput. However, these designs have several key limitations. First, the redundant switches and cables significantly increase the cost for building the network architecture. Second, the complicated interconnections lead to high cabling complexity, making such designs infeasible in practice. Third, the achieved all-time all-to-all non-blocking network communication is not necessary in practical settings, where high-throughput communications are required only during certain periods of time and are constrained to a subset of servers, which may change over time.

A second such proposed architecture attempts to address these limitations by constructing an over-subscribed network with on-demand high-throughput paths to resolve network congestion and hotspots. Specifically, c-Through and Helios design hybrid electrical and optical network architectures, where the electrical part is responsible for maintaining connectivity between all servers and delivering traffic for low-bandwidth flows and the optical part provides on-demand high-bandwidth links for server pairs with heavy network traffic. Another proposal called Flyways is very similar to c-Through and Helios, except that it replaces the optical links with wireless connections. These proposals suffer from similar drawbacks.

Compared to these architectures, a newly proposed system, called OSA, pursues an all-optical design and employs optical switching and optical wavelength division multiplexing technologies. However, the optical switching matrix or Microelectromechanical systems (MEMS) component in OSA significantly increases the cost of the proposed architecture and more importantly limits the applicability of OSA to only small or medium sized data centers.

Accordingly, it is desirable to provide a high-dimensional optical circuit switching fabric with wavelength division multiplexing and wavelength switching and routing technologies that is suitable for all sizes of data centers, and that reduces the cost and improves the scalability and reliability of the system. It is further desirable to control the optical circuit switching fabric to support high-performance interconnection of a large number of network nodes or servers.

SUMMARY OF THE INVENTION

In one embodiment, an optical switching system is described. The system includes a plurality of interconnected wavelength selective switching units. Each of the wavelength selective switching units is associated with one or more server racks. The interconnected wavelength selective switching units are arranged into a fixed structure high-dimensional interconnect architecture comprising a plurality of fixed and structured optical links. The optical links are arranged in a k-ary n-cube, ring, mesh, torus, direct binary n-cube, indirect binary n-cube, Omega network or hypercube architecture.

In another embodiment, a broadcast/select optical switching unit is described. The optical switching unit includes a multiplexer, an optical power splitter, a wavelength selective switch and a demultiplexer. The multiplexer has a plurality of first input ports. The multiplexer is configured to combine a plurality of signals in different wavelengths from the plurality of first input ports into a first signal output on a first optical link. The optical power splitter has a plurality of first output ports. The optical power splitter is configured to receive the first signal from the first optical link and to duplicate the first signal into a plurality of duplicate first signals on the plurality of first output ports. The duplicated first signal is transmitted to one or more second optical switching units. The wavelength selective switch has a plurality of second input ports. The wavelength selective switch is configured to receive one or more duplicated second signals from one or more third optical switching units and to output a third signal on a second optical link. The one or more duplicated second signals are generated by second optical power splitters of the one or more third optical switching units. The demultiplexer has a plurality of second output ports Each second output port has a distinct wavelength. The demultiplexer is configured to receive the third signal from the second optical link and to separate the third signal into the plurality of second output ports.

An optical switching fabric comprising a plurality of optical switching units. The plurality of optical switching units are arranged into a fixed structure high-dimensional interconnect architecture. Each optical switching unit includes a multiplexer, a wavelength selective switch, an optical power combiner and a demultiplexer. The multiplexer has a plurality of first input ports. The multiplexer is configured to combine a plurality of signals in different wavelengths from the plurality of first input ports into a first signal output on a first optical link. The wavelength selective switch has a plurality of first output ports. The wavelength selective switch is configured to receive the first signal from the first optical link and to divide the first signal into a plurality of second signals. Each second signal has a distinct wavelength. The plurality of second signals are output on the plurality of first output ports. The plurality of second signals are transmitted to one or more second optical switching units. The optical power combiner has a plurality of second input ports. The optical power combiner is configured to receive one or more third signals having distinct wavelengths from one or more third optical switching units and to output a fourth signal on a second optical link. The fourth signal is a combination of the received one or more third signals. The demultiplexer has a plurality of second output ports. Each second output port has a distinct wavelength. The demultiplexer is configured to receive the fourth signal from the second optical link and to separate the fourth signal into the plurality of second output ports based on their distinct wavelengths.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown.

DETAILED DESCRIPTION OF THE PREFERRED EMBODIMENTS

Figure 1:
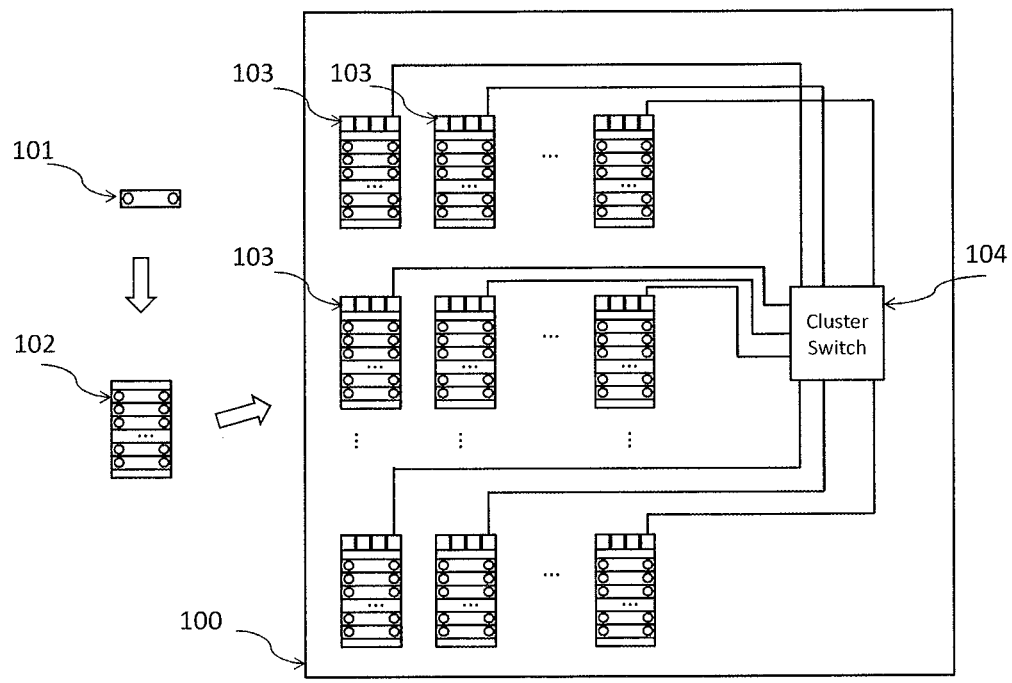
FIG. 1 is a system diagram of a data center network according to a preferred embodiment of the present invention.

Certain terminology is used in the following description for convenience only and is not limiting. The words "right", "left", "lower", and "upper" designate directions in the drawings to which reference is made. The terminology includes the above-listed words, derivatives thereof, and words of similar import. Additionally, the words "a" and "an", as used in the claims and in the corresponding portions of the specification, mean "at least one."

The present invention will be described in detail with reference to the drawings. The figures and examples below are not meant to limit the scope of the present invention to a single embodiment, but other embodiments are possible by way of interchange of some or all of the described or illustrated elements. Moreover, where some of the elements of the present invention can be partially or fully implemented using known components, only portions of such known components that are necessary for an understanding of the present invention will be described, and a detailed description of other portions of such known components will be omitted so as not to obscure the invention.

Referring to the drawings in detail, wherein like reference numerals indicate like elements throughout, FIG. 1 is a system diagram, which illustrates the typical components of a data center 100 in accordance with the present invention. The most basic elements of a data center are servers 101, a plurality of which may be arranged into server racks 102. Each server rack 102 is equipped with a top-of-rack switch (ToR) 103. All of the ToRs 103 are further interconnected with one or multiple layers of cluster (e.g., aggregation and core) switches 104 such that every server 101 in the data center 100 can communicate with any one of the other servers 101. The present invention is directed to the network switching fabric interconnecting all ToRs 103 in the data center 100.

Figure 4:
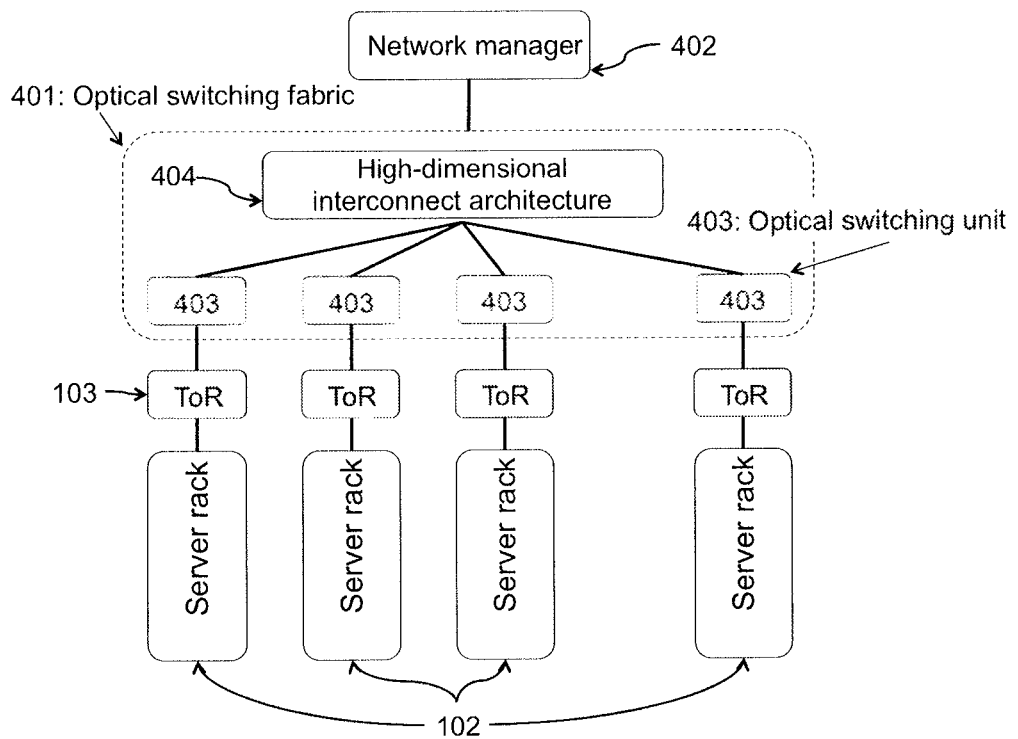
FIG. 4 is a system architecture of an optical switched data center network according to a preferred embodiment of the present invention.

Referring to FIG. 4, a high-dimensional optical switching fabric 401 for use with the data center 100 of FIG. 1 is shown. The switching fabric 401 includes a plurality of wavelength selective switching units 403 interconnected using a high-dimensional data center architecture 404. The high-dimensional data center architecture 404 is achieved by coupling multiple wavelength selective switching units 403 with fixed and structured fiber links to form a high-dimensional interconnection architecture. Each wavelength selective switching unit 403 is associated with, and communicatively coupled to, a server rack 102 through a ToR 103. The high-dimensional data center architecture 404 preferably employs a generalized k-ary n-cube architecture, where k is the radix and n is the dimension of the graph. The design of the wavelength selective switching units 403 and the associated procedures of the network manager 402 are not limited to k-ary n-cube architectures. Other architectures that are isomorphic to k-ary n-cubes, including rings, meshes, tori, direct or indirect binary n-cubes, Omega network, hypercubes, etc may also be implemented in the high-dimensional data center architecture 404, and are within the scope of this disclosure.

Figure 2:
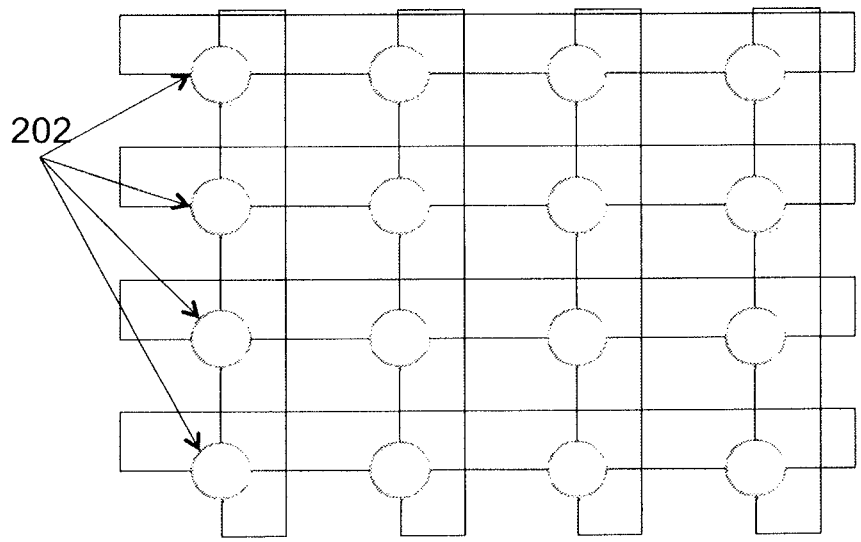
FIG. 2 is a network topology of 4-ary 2-cube architecture implemented in the data center network of FIG. 1.
Figure 3:
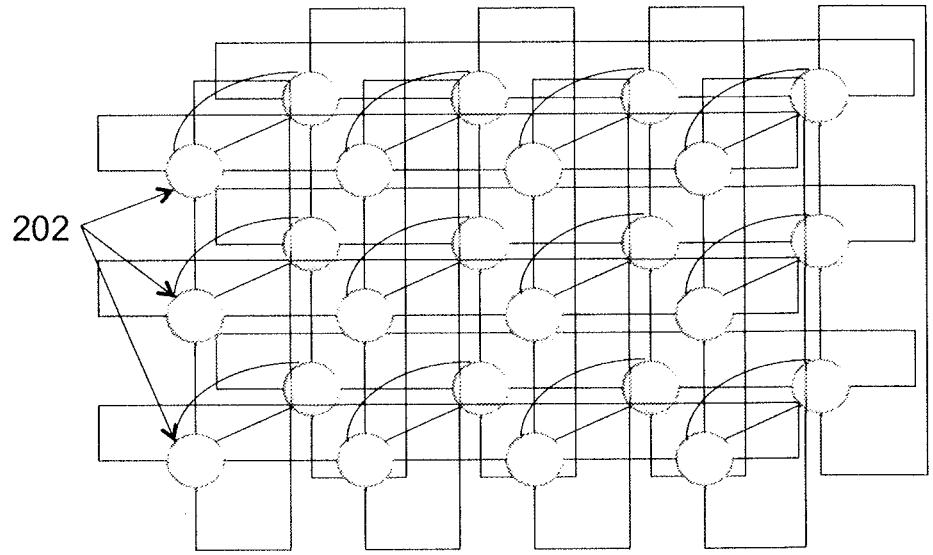
FIG. 3 is a network topology of a (3, 4, 2)-ary 3-cube architecture implemented in the data center network of FIG. 1.

The k-ary n-cube architecture is denoted by $C^n_k$, where n is the dimension and vector $k=<k_1, k_2, \ldots, k_n>$ denotes the number of elements in each dimension. Referring to FIGS. 2 and 3, examples of a 4-ary 2-cube (i.e., k=<4,4> and n=2) and (3, 4, 2)-ary 3-cube (i.e., k=<3,4,2> and n=3), respectively, are shown. Each node 202 in FIGS. 2 and 3 represents a server rack 102 (including a ToR 103) and its corresponding wavelength selective switching unit 403 (also referred to herein as an "optical switching unit"). Other examples of architectures are not shown for sake of brevity, but those skilled in the art will understand that such alternative architectures are within the scope of this disclosure.

Two designs of the wavelength selective switching unit 403 of FIG. 4 are described with reference to FIG. 5 and prior art FIG. 6. The designs of FIGS. 5 and 6 vary based on whether the underlying communication mechanism is broadcast-and-select or point-to-point. Furthermore, a broadcast-and-select based wavelength selective switching unit 503 may be symmetric or asymmetric, depending on the requirements and constraints of practical settings.

Symmetric Architecture

Figure 5:
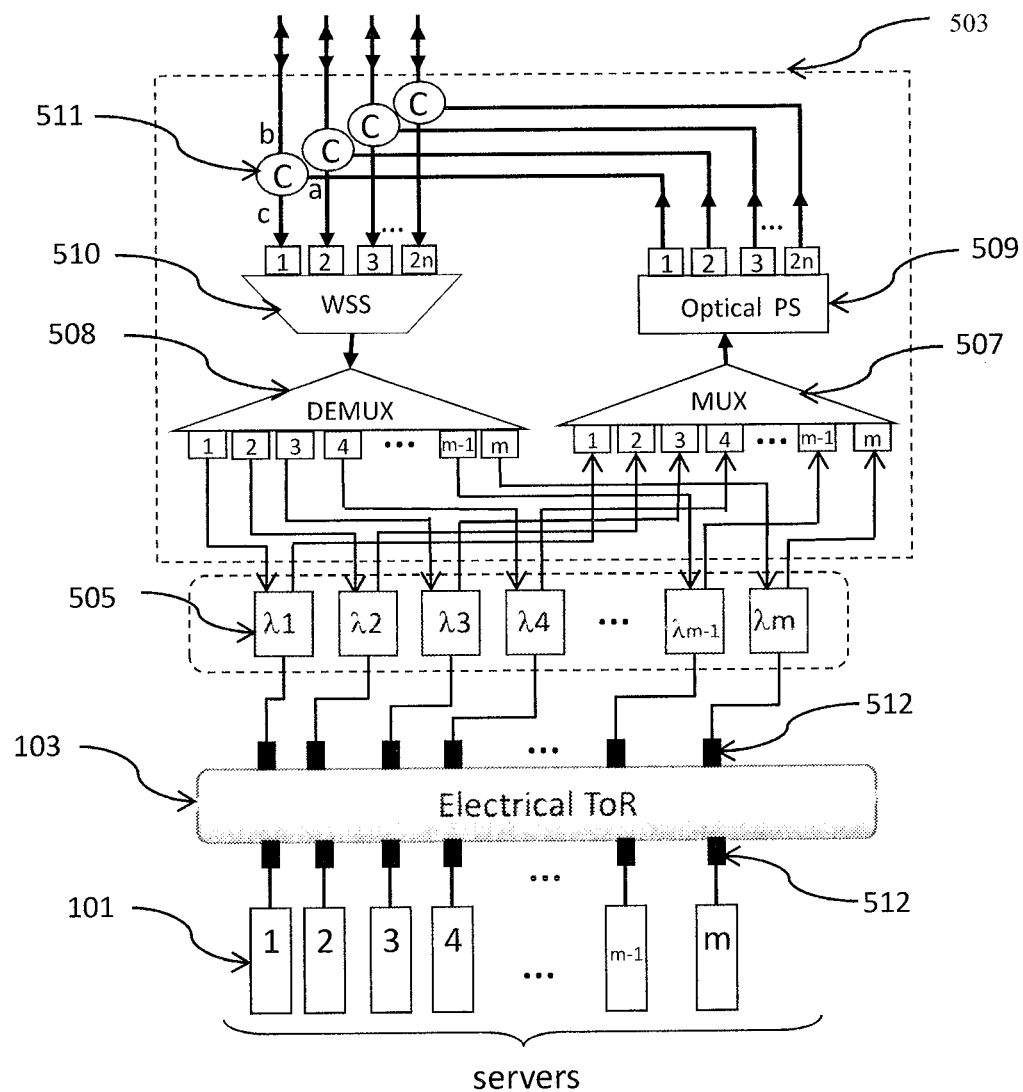
FIG. 5 is a wavelength selective switching unit architecture using a broadcast-and-select communication mechanism according to a preferred embodiment of this invention.
Figure 6:
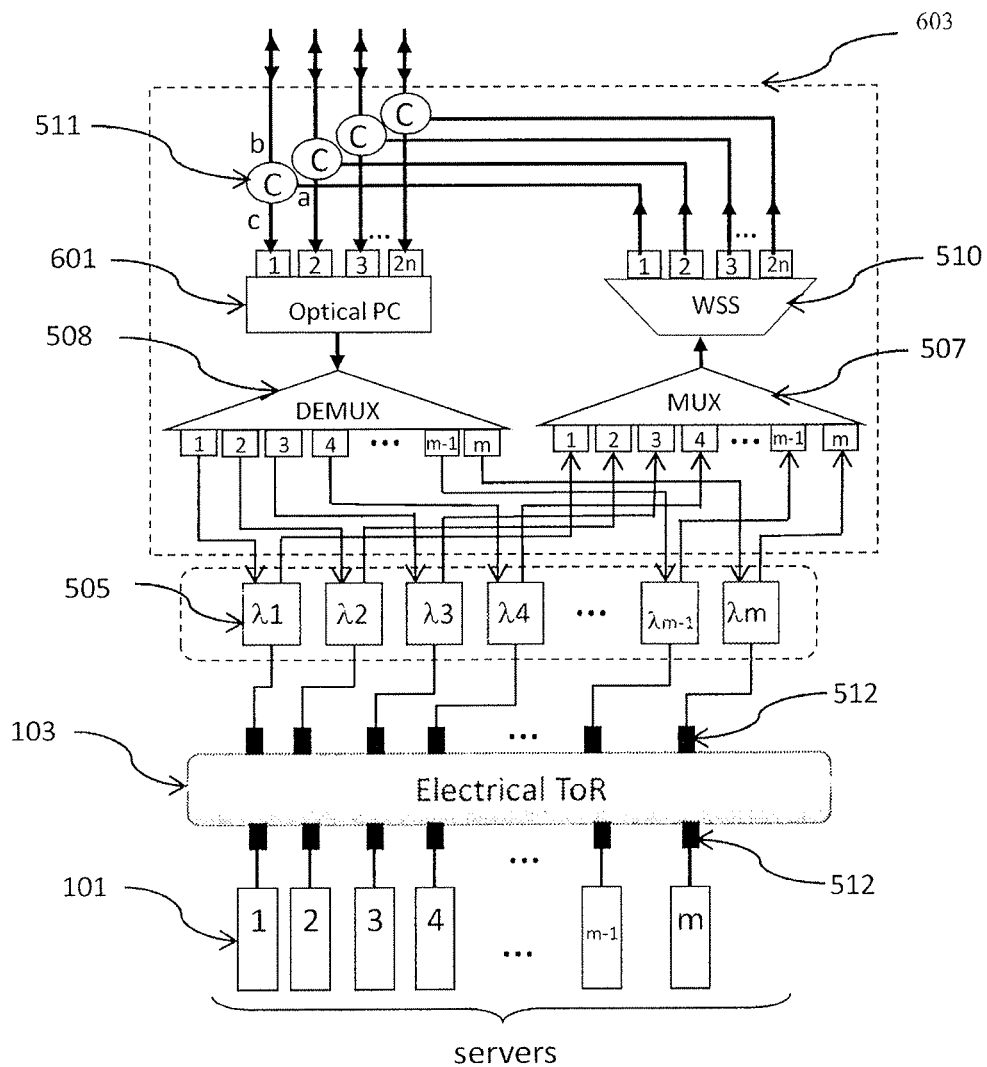
FIG. 6 is an wavelength selective switching unit architecture using the point-to-point communication mechanism according to the prior art.

A symmetric architecture of a broadcast-and-select based wavelength selective switching unit 503 connected to ToR 103 and servers 101 is shown in FIG. 5. Each electrical ToR 103 has 2m downstream ports. Downstream ports usually have lower line speed and are conventionally used to connect to the servers 101. The higher-speed upstream ports are described below with respect to the asymmetric architecture below.

In the symmetric wavelength selective switching unit 503 of FIG. 5, half of the 2m downstream ports of electrical ToR 103 are connected to rack servers 101 and the other half are connected to m optical transceivers 505 at different wavelengths, $\lambda 1, \lambda 2, \ldots \lambda m$. In typical applications, the optical transceivers 505 have small form-factors, such as the SFP (Small Form Factor Pluggable) type optical transceivers, at different wavelengths following typical wavelength division multiplexing (WDM) grids. Each optical transceiver 505, typically consisting of a SFP type optical module sitting on a media converter (not shown), has one electrical signal connecting port 512 (such as an electrical Ethernet port), one optical transmitting port and one optical receiving port. The bit rate of the optical transceivers 505 at least matches or is higher than that of the Ethernet port 512. For instance, if the Ethernet port 512 supports 1 Gb/s signal transmission, the bit rate of each optical transceiver 505 can be 1 Gb/s or 2.5 Gb/s; if the Ethernet port 512 is 10 Gb/s, the bit rate of each optical transceiver 505 is preferably 10 Gb/s as well. This configuration assures non-blocking communication between the servers 101 residing in the same server rack 102 and the servers 101 residing in all other server racks 102.

Logically above the ToR 103 is a broadcast-and-select type design for the wavelength selective switching units 503. The wavelength selective switching units 503 are further interconnected via fixed and structured fiber links to support a larger number of server inter communications. Each wavelength selective switching unit 503 includes an optical signal multiplexing unit (MUX) 507, an optical signal demultiplexing unit (DEMUX) 508 each with m ports, a 1×2n optical wavelength selective switch (WSS) 510, a 1×2n optical power splitter (PS) 509, and 2n optical circulators (c) 511. The optical MUX 507 combines the optical signals at different wavelengths for transmission in a single fiber. Typically, two types of optical MUX 507 devices can be used. In a first type of optical MUX 507, each of the input ports does not correspond to any specific wavelength, while in the second type of optical MUX 507, each of the input ports corresponds to a specific wavelength. The optical DEMUX 508 splits the multiple optical signals in different wavelengths in the same fiber into different output ports. Preferably, each of the output ports corresponds to a specific wavelength. The optical PS 509 splits the optical signals in a single fiber into multiple fibers. The output ports of the optical PS 509 do not have optical wavelength selectivity. The WSS 510 can be dynamically configured to decide the wavelength selectivity of each of the multiple input ports. As for the optical circulators 511, the optical signals arriving via port "a" come out at port "b", and optical signals arriving via port "b" come out at port "c". The optical circulators 511 are used to support bidirectional optical communications in a single fiber. However, in other embodiments, optical circulators 511 are not required, and may be replaced with two fibers instead of a single fiber.

In the wavelength selective switching unit 503 of FIG. 5, the optical transmitting port of the transceiver 505 is connected to the input port of the optical MUX 507. The optical MUX 507 combines m optical signals from m optical transceivers 505 into a single fiber, forming WDM optical signals. The output of optical MUX 507 is connected to the optical PS 509. The optical PS 509 splits the optical signals into 2n output ports. Each of the output ports of the optical PS 509 has the same type of optical signals as the input to the optical PS 509. Therefore, the m transmitting signals are broadcast to all of the output ports of the optical PS 509. Each of the output ports of optical PS 509 is connected to port "a" of an optical circulator 511, and the transmitting signal passes port "a" and exits at port "b" of optical circulator 511.

In the receiving part of the wavelength selective switching unit 503, optical signals are received from other wavelength selective switching units 503. The optical signals arrive at port "b" of optical circulators 511, and leave at port "c". Port "c" of each optical circulator 511 is coupled with one of the 2n ports of WSS 510. Through dynamic configuration of the WSS 510 with the algorithms described below, selected channels at different wavelengths from different server racks 102 can pass the WSS 510 and be further demultiplexed by the optical DEMUX 508. Preferably, each of the output ports of optical DEMUX 508 corresponds to a specific wavelength that is different from other ports. Each of the m output ports of the optical DEMUX 508 is preferably connected with the receiving port of the optical transceiver 505 at the corresponding wavelength.

Inter-rack communication is conducted using broadcast and select communication, wherein each of the outgoing fibers from the optical PS 509 carries all the m wavelengths (i.e., all outgoing traffic of the rack). At the receiving end, the WSS 510 decides what wavelengths of which port are to be admitted, and then forwards them to the output port of the WSS 510, and the output of the WSS 510 that is connected to the optical DEMUX 508. The optical DEMUX 508 separates the WDM optical signals into the individual output port, which is connected to the receiving port of the optical transceivers 505. Each ToR 103 combined with one wavelength selective switching unit 503 described above constitutes a node 202 in FIGS. 2 and 3. All of the nodes 202 are interconnected following a high-dimensional architecture 404. All the wavelength selective switching units 503 are further controlled by a centralized or distributed network manager 402. The network manager 402 continuously monitors the network situation of the data center 100, determines bandwidth demand of each flow, and adaptively reconfigures the network to improve the network throughput and resolve hot spots. These functionalities are realized through a plurality of procedures, described in further detail below.

Asymmetric Architecture

The asymmetric architecture broadcast-select architecture achieves 100% switch port utilization, but at the expense of lower bisection bandwidth. The asymmetric architecture is therefore more suitable than the symmetric architecture for scenarios where server density is of major concern. In an asymmetric architecture, the inter-rack connection topology is the same as that of the symmetric counterpart. The key difference is that the number of the ports of a ToR 103 that are connected to servers is greater than the number of the ports of the same ToR 103 that are connected to the wavelength selective switching unit 403. More specifically, each electrical ToR 103 has m downstream ports, all of which are connected to servers 101 in a server rack 102. Each ToR 103 also has u upstream ports, which are equipped with u small form factor optical transceivers at different wavelength, $\lambda 1, \lambda 2, \ldots \lambda u$. In a typical 48-port GigE switch with four 10 GigE upstream ports, for instance, we have 2m=48 and u=4.

Logically above the ToR 103 is the wavelength selective switching unit 503, which consists of a multiplexer 507 and a demultipexer 508, each with u ports, a 1×2n WSS, and a 1×2n power splitter (PS) 509. The transmitting ports and receiving ports of the optical transceivers are connected to the corresponding port of optical multiplexer 507 and demultiplexer 508, respectively. The output of optical multiplexer 507 is connected to the input of optical PS 509, and the input of the optical demultiplexer 508 is connected to the output of the WSS 510. Each input port of the WSS 510 is connected directly or through an optical circulator 511 to an output port of PS of the wavelength selective switching unit 403 in another rack 102 via an optical fiber. Again, the optical circulator 511 may be replaced by two fibers.

In practice, it is possible that the ports, which are originally dedicated for downstream communications connected with servers 101, can be connected to the wavelength selective switching unit 403, together with the upstream ports. In this case, the optical transceivers 505 may carry a different bit rate depending on the link capacity of the ports they are connected to. Consequently, the corresponding control software will also need to consider the bit rate heterogeneity while provisioning network bandwidth, as discussed further below.

In both the symmetric and asymmetric architectures, a network manager 402 optimizes network traffic flows using a plurality of procedures. These procedures will now be described in further detail.

Procedure 1: Estimating Network Demand.

The first procedure estimates the network bandwidth demand of each flow. Multiple options exist for performing this estimation. One option is to run on each server 101 a software agent that monitors the sending rates of all flows originated from the local server 101. Such information from all servers 101 in a data center can be further aggregated and the server-to-server traffic demand can be inferred by the network manager 402. A second option for estimating network demand is to mirror the network traffic at the ToRs 103 using switched port analyzer (SPAN) ports. After collecting the traffic data, network traffic demand can be similarly inferred as in the first option. The third option is to estimate the network demand by emulating the additive increase and multiplicative decrease (AIMD) behavior of TCP and dynamically inferring the traffic demand without actually capturing the network packets. Based on the deployment scenario, a network administrator can choose the most efficient mechanism from these or other known options.

Procedure 2: Determining Routing.

Figure 7:
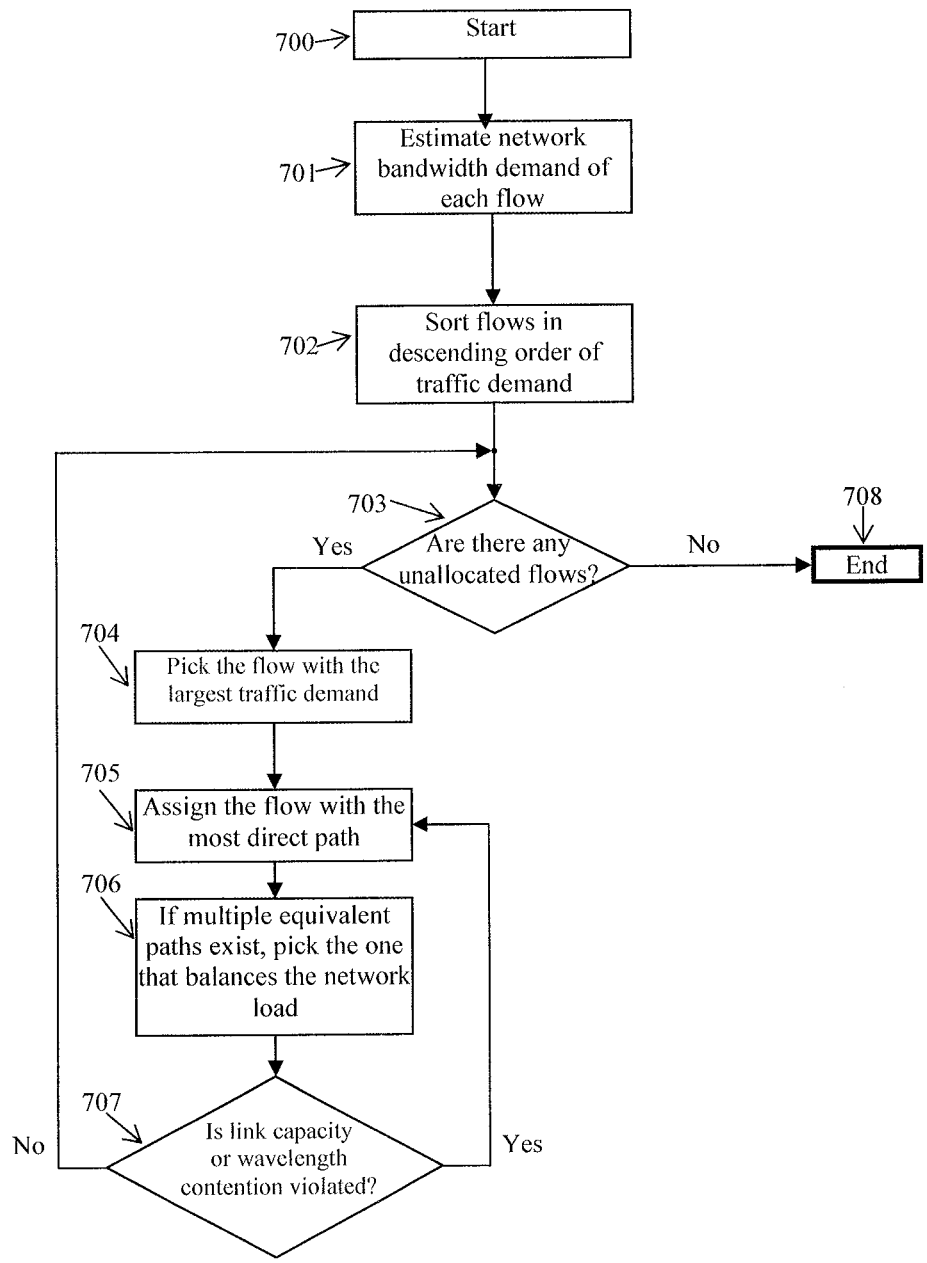
FIG. 7 is a flowchart of steps for determining routing of flows according to a preferred embodiment of this invention.

In the second procedure, routing is allocated in a greedy fashion based on the following steps, as shown in the flow chart of FIG. 7. The process begins at step 700 and proceeds to step 701, where the network manager 402 identifies the source and destination of all flows, and estimates the network bandwidth demand of all flows. At step 702, all flows are sorted in a descending order of the network bandwidth demand of each flow. At step 703, it is checked whether all of the flows have been allocated a path. If all flows have been allocated a path, the procedure terminates in step 708. Otherwise, the network manager 402 identifies the flow with the highest bandwidth demand in step 704 and allocates the most direct path to the flow in step 705. If multiple equivalent direct paths of a given flow exist, in step 706, the network manager chooses the path that balances the network load. The network manager 402 then checks whether the capacities of all links in the selected path are exceeded in step 707. Link capacity is preferably decided by the receivers, instead of the senders, which broadcast all the m wavelengths to all the 2n direct neighbors.

If the capacity of at least one of the links in the selected path is exceeded, the network manager goes back to step 705 and picks the next most direct path and repeats steps 706 and 707. Otherwise, the network manager 402 goes to step 704 to pick the flow with the second highest bandwidth demand and repeats steps 705 through 707.

In a physical network, each server rack 102 is connected to another server rack 102 by a single optical fiber. But logically, the link is directed. From the perspective of each server 101, all the optical links connecting other optical switching modules in both the ingress and egress directions carry all the m wavelengths. But since these m wavelengths will be selected by the WSS 510 at the receiving end, these links can logically be represented by the set of wavelengths to be admitted.

Figure 8:
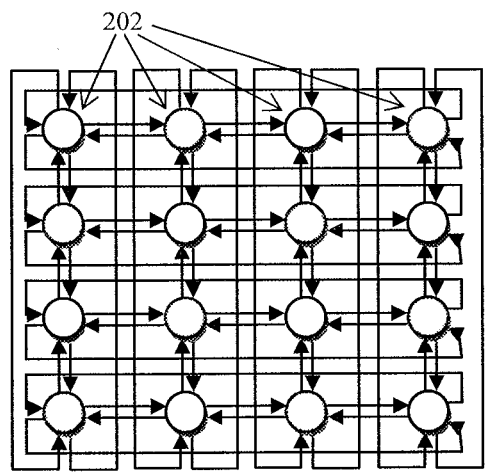
FIG. 8 is a logical graph of a 4-array 2-cube network using the wavelength selective switching unit of FIG. 5.

The logical graph of a 4-ary 2-cube cluster is illustrated in FIG. 8. Each directed link in the graph represents the unidirectional transmission of the optical signal. For ease of illustration, the nodes 102 are indexed from 1 to k in each dimension. For instance, the i-th element in column j is denoted by (i,j). All nodes in $\{(i,j)|i=1, 3, \ldots, k-1, j=2, 4, \ldots, k\}$ and all nodes in $\{(i,j)|i=2, 4, \ldots, k, j=1, 3, \ldots, k-1\}$ are shown in WHITE, and all the remaining nodes are shaded. As long as k is even, such a perfect shading always exists.

Figure 9:
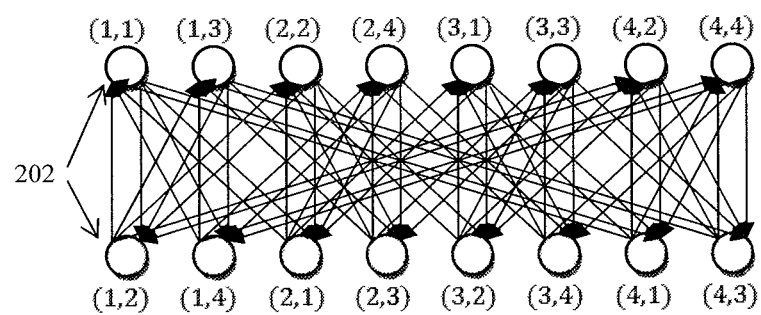
FIG. 9 is a bipartite graph representation of the logical graph of FIG. 8.

Next, all the WHITE nodes are placed on top, and all GREY nodes are placed on the bottom, and a bipartite graph is obtained, as shown in FIG. 9. In the graph of FIG. 9, all directed communications are between WHITE and GREY colored nodes, and no communications occur within nodes of the same color. This graph property forms the foundation of the key mechanisms of the present system, including routing and bandwidth provisioning.

Procedure 3: Provisioning Link Bandwidth and Assigning Wavelengths.

Figure 10:
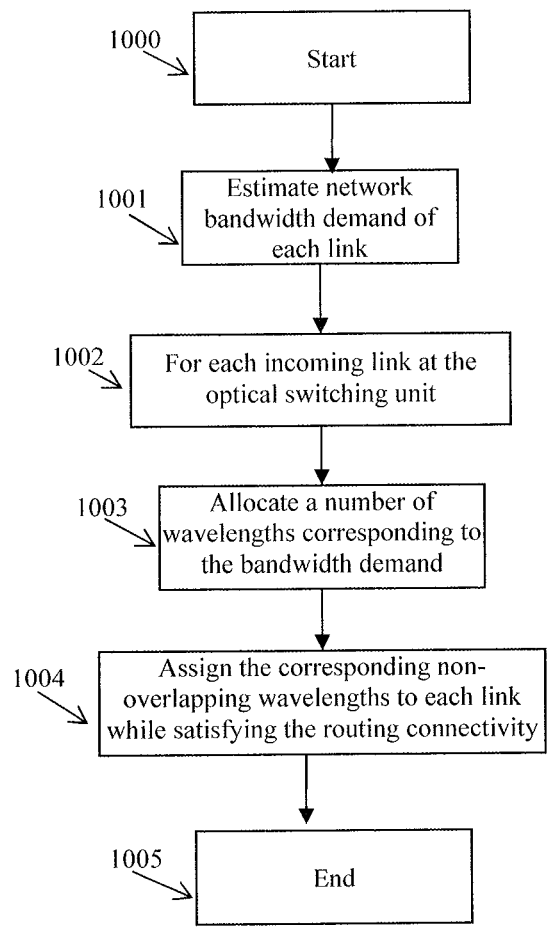
FIG. 10 is a flowchart of steps for provisioning bandwidth and assigning wavelengths on each link in the broadcast-and-select based system of FIG. 5.

In this procedure, the network manager 402 provisions the network bandwidth based on the traffic demand obtained from Procedure 1 and/or Procedure 2, and then allocates wavelengths to be admitted at different receiving WSSs 510, based on the following steps, as shown in the flowchart of FIG. 10. The process begins at step 1000, and proceeds to step 1001 where the network manager 402 estimates the bandwidth demand of each optical link based on the bandwidth demand of each flow. In step 1002, the network manager 402 determines for each link the number of wavelengths necessary to satisfy the bandwidth demand for that link. In step 1003, the network manager 402 allocates a corresponding number of wavelengths to each link such that there is no overlap between the sets of wavelengths allocated to all the input optical links connected to the same wavelength selective switch 510.

In step 1004, since at the WSS 510, the same wavelength carried by multiple optical links cannot be admitted simultaneously (i.e., the wavelength contention problem), the network manager 402 needs to ensure that for each receiving node, there is no overlap of wavelength assignment across the 2n input ports. Thereafter, the process ends at step 1005.

Procedure 4: Minimizing Wavelength Reassignment.

Figure 11:
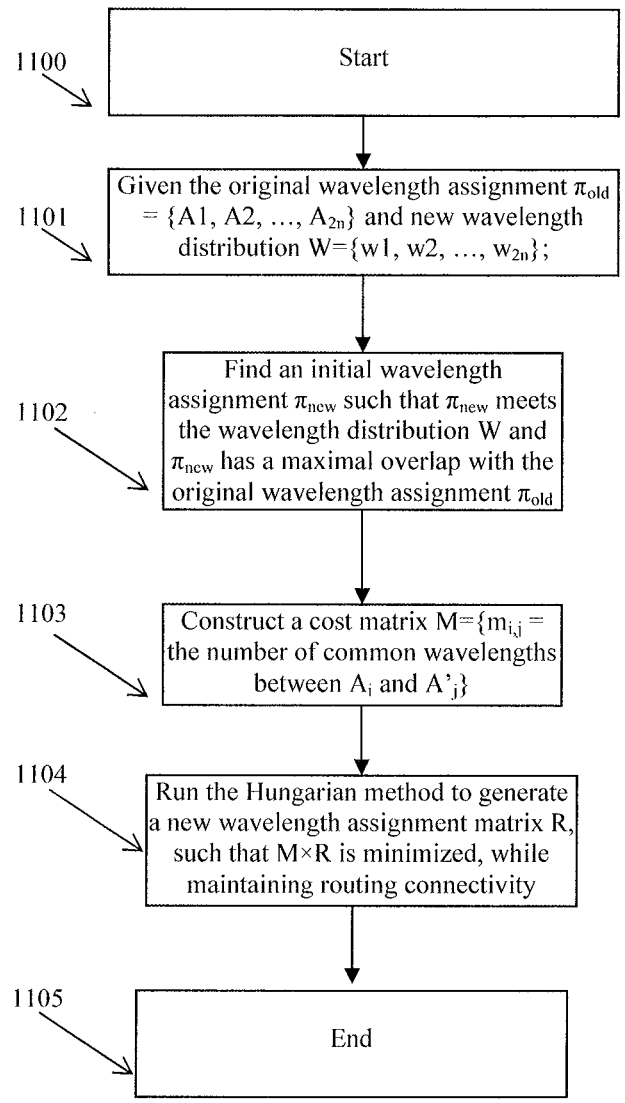
FIG. 11 is a flowchart of steps for minimizing wavelength reassignment in the broadcast-and-select based system of FIG. 5.

Procedure 3 does not consider the impact of changes of wavelength assignment, which may disrupt network connectivity and lead to application performance degradation. Thus, in practice, it is desirable that only a minimum number of wavelength changes are performed to satisfy the bandwidth demands. Therefore, it is desirable to maximize the overlap between the old wavelength assignment $\pi_{old}$ and the new assignment $\pi_{new}$. The classic Hungarian method can be adopted as a heuristic to achieve this goal. The Hungarian method is a combinatorial optimization algorithm to solve assignment problems in polynomial time. This procedure is described with reference to the flow chart of FIG. 11. The process begins at step 1100, and proceeds to step 1101, at which the network manager 402 first identifies the old wavelength assignment $\pi_{old} = \{A1, A2, \ldots, A2n\}$ (where Ai denotes the set of wavelengths assigned to link i) and wavelength distribution (i.e., the number of wavelength required for each link) under the new traffic matrix. At step 1102, the network manager 402 finds a new wavelength assignment $\pi_{new} = \{A'1, A'2, \ldots, A'2n\}$ that satisfies the wavelength distribution and has as much overlap with $\pi_{old}$ as possible. In step 1103, the network manager 402 constructs a cost matrix M, whose each element $m_{ij}$ is equal to the number of common wavelengths between sets Ai and A'j. Finally, in step 1104, the network manager 402 generates a new wavelength assignment matrix R $$\left(\text{where } r_{ij} \in (0, 1), \sum_i r_{ij} = 1, \text{ and } \sum_j r_{ij} = 1\right),$$

such that M×R is minimized, while maintaining routing connectivity. The process ends at step 1105.

Procedure 5: Recovering From Network Failures.

The fifth procedure achieves highly fault-tolerant routing. Given the n-dimensional architecture, there are 2n node-disjoint parallel paths between any two ToRs 103. Upon detecting a failure event, the associated ToRs 103 notifies the network manager 402 immediately, and the network manager 402 informs all the remaining ToRs 103. Each ToR 103 receiving the failure message can easily check which paths and corresponding destinations are affected, and detour the packets via the rest of the paths to the appropriate destinations. Applying this procedure allows the performance of the whole system to degrade very gracefully even in the presence of a large percentage of failed network nodes and/or links.

Procedure 6: Conducting Multicast, Anycast or Broadcast.

In the broadcast-and-select based design, each of the 2n egress links of a ToR 103 carries all the m wavelengths. It is left up to the receiving WSS 510 to decide what wavelengths to admit. Thus, multicast, anycast or broadcast can be efficiently realized by configuring the WSSs 510 in a way that the same wavelength of the same ToR 103 is simultaneously admitted by multiple ToRs 103. The network manager 402 needs to employ methods similar to the IP-based counterparts to maintain the group membership for the multicast, anycast or broadcast.

In the symmetric architecture described so far, the number of the ports of a ToR 103 switch that are connected to servers equals the number of the ports of the same ToR that are connected to the wavelength selective switching unit 403. This architecture achieves high bisection bandwidth between servers 101 residing in the same server rack 102 with the rest of the network at the expense of only 50% switch port utilization.

Point-to-Point Communication Mechanism

The architecture of the wavelength selective switching unit 603 used for point-to-point communication is described in U.S. Patent Application Publication Nos. 2012/0008944 to Ankit Singla and 2012/0099863 to Lei Xu, the entire disclosures of both of which are incorporated by reference herein. In the present invention, these point-to-point based wavelength selective switching units 603 are arranged into the high-dimensional interconnect architecture 404 in a fixed structure. In the wavelength selective switching unit 603, as illustrated with reference to FIG. 6, each electrical ToR 103 has 2m ports, half of which are connected to rack servers 101 and the other half are connected with m wavelength-division multiplexing small form-factor pluggable (WDM SFP) transceivers 505.

Logically above the ToR 103 are the wavelength selective switching units 603, which are further interconnected to support a larger number of inter communications between servers 101. Each wavelength selective switching unit 603 includes optical MUX 507 and DEMUX 508 each with m ports, a 1×2n optical wavelength selective switch (WSS) 510, a 1×2n optical power combiner (PC) 601, and 2n optical circulators 511. In operation, the optical PC 601 combines optical signals from multiple fibers into a single fiber. The WSS 510 can be dynamically configured to decide how to allocate the optical signals at different wavelengths in the single input port into one of the different output ports. The optical circulators 511 are used to support bi-directional optical communications using a single fiber. Again, the optical circulators 511 are not required, as two fibers can be used to achieve the same function.

Similar to the broadcast-and-select based system described earlier, all the wavelength selective switching units 403 are interconnected using a high-dimensional architecture and are controlled by the network manager 402. The network manager 402 dynamically controls the optical switch fabric following the procedures below.

Procedures 1, 2, 5 and 6 are the same as the corresponding procedures discussed above with respect to the broadcast-and-select based system.

Procedure 3: Provisioning Link Bandwidth and Assigning Wavelengths on All Links

Figure 12:
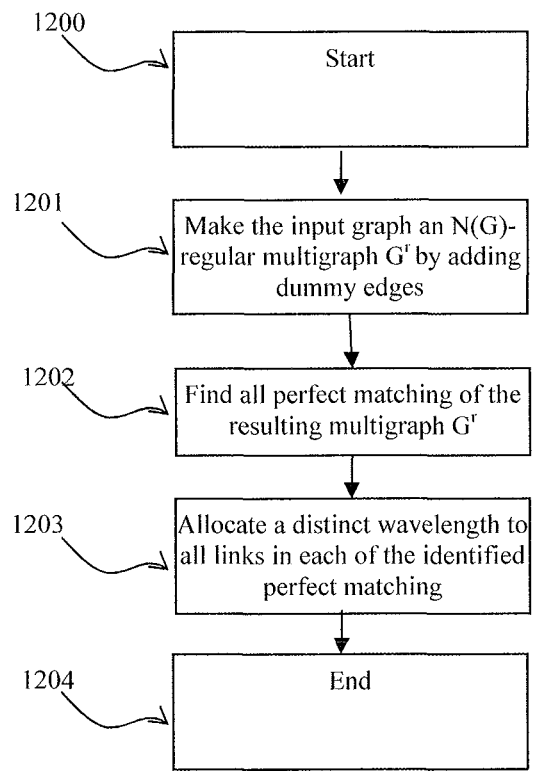
FIG. 12 is a flowchart of steps for provisioning bandwidth and assigning wavelengths on each link in the point-to-point based prior art system of FIG. 6.

The third procedure of the point-to-point architecture is described with reference to FIG. 12, wherein N(G) is the maximum node degree of a bipartite graph G. Each node of G represents a wavelength selective switching unit 603. The procedure begins at step 1200, and proceeds to step 1201 where the network manager 402 first constructs a N(G)-regular (i.e., each node in the graph G has exactly degree of N(G)) multi-graph (where multiple links connecting two nodes is allowed) by adding wavelength links, each representing a distinct wavelength, to each node of G. Next, in step 1202, the network manager 402 identifies all sets of links such that within each set there are no two links sharing a common node and the links in the same set covers all nodes in the graph G. In step 1203, the network manager 402 assigns a distinct wavelength to all links in the same set by configuring the wavelength selective switch 510. The process then ends at step 1204.

Procedure 4: Minimizing Wavelength Reassignment.

This procedure is similar to Procedure 4 in the broadcast-and-select based system, finding a minimum set of wavelengths, while satisfying the bandwidth demands. This procedure first finds a new wavelength assignment $\pi_{new}$, which has a large wavelength overlap with the old assignment $\pi_{old}$. Then, uses $\pi_{new}$ as the initial state and uses an adapted Hungarian method to fine-tune $\pi_{new}$ to further increase the overlap between $\pi_{new}$ and $\pi_{old}$.

In the present invention, all of the wavelength selective switching units 603 are interconnected using a fixed specially designed high-dimensional architecture. Ideal scalability, intelligent network control, high routing flexibility, and excellent fault tolerance are all embedded and efficiently realized in the disclosed fixed high dimensional architecture. Thus, network downtime and application performance degradation due to the long switching delay of an optical switching matrix are overcome in the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An optical switching system comprising:
   a fixed structure high-dimensional interconnect architecture comprising a plurality of fixed and structured optical links, the links arranged in a k-ary n-cube, ring, mesh, torus, direct binary n-cube, indirect binary n-cube, Omega network or hypercube architecture;

a plurality of optical switching units communicating over the high-dimensional interconnect architecture;

a top of rack (ToR) switch connected to each optical switching unit through wavelength division multiplexing (WDM) transceivers;

wherein each optical switching unit is connected to one or more other optical switching units through fixed optical links in the high-dimensional interconnect architecture, and wherein the plurality of optical switching units multiplex the WDM signals transmitted from the ToR switches and broadcast all the transmitted WDM signals to the high-dimensional interconnect architecture, and wherein the plurality of optical switching units receive and select the WDM signals transmitted from other optical switching units connected through the high-dimensional interconnect architecture, and demultiplex the WDM signals for ToR switch receiving via the WDM transceivers; and a plurality of circulators which support bi-directional optical communications between the plurality of optical switching units and the fixed structure high-dimensional interconnect architecture.

2. The optical switching system of claim 1, wherein each optical switching unit employs broadcast/select based communications mechanisms.

3. The optical switching system of claim 1, wherein each optical switching unit employs point-to-point based communications mechanisms.

4. The optical switching system of claim 1, wherein the plurality of optical switching units are scalable to support one or more additional server racks.

5. A broadcast-and-select optical switching unit comprising:
a multiplexer having a plurality of first input ports, the multiplexer configured to combine a plurality of signals in different wavelengths from the plurality of first input ports into a first signal output on a first optical link;
an optical power splitter having a plurality of first output ports, the optical power splitter configured to receive the first signal from the first optical link and to duplicate the first signal into a plurality of duplicate first signals on the plurality of first output ports, wherein the duplicated first signals are transmitted to one or more other broadcast-and-select optical switching units;
a wavelength selective switch having a plurality of second input ports, the wavelength selective switch configured to receive one or more duplicated second signals from the one or more other broadcast-and-select optical switching units and to output a third signal on a second optical link, wherein the one or more duplicated second signals are generated by second optical power splitters of the one or more other broadcast-and-select optical switching units;
a demultiplexer having a plurality of second output ports, each second output port having a distinct wavelength, the demultiplexer configured to receive the third signal from the second optical link and to separate the third signal into the plurality of second output ports; and
a plurality of circulators, each circulator having first, second and third ports, wherein the first port is an input port that receives one of the duplicated first signals, the second port is an output port that outputs one of the duplicated second signals, and the third port is a common port that outputs the duplicate first signals from the first ports, and receives duplicated first signals from the one or more other broadcast-and-select optical switching units, and transmits:
(i) the first signal received from the first port to the one or more other broadcast-and-select optical switching units, and
(ii) the duplicated second signal received from the one or more other broadcast-and-select optical switching units to one of the plurality of second input ports of the wavelength selective switch.

6. The broadcast-and-select optical switching unit of claim 5, further comprising:
a plurality of transceivers, each transceiver having an upstream port, a downstream port, and an Ethernet port, wherein for each of the transceivers, the upstream port is connected to one of the input ports of the multiplexer and the downstream port is connected to one of the output ports of the demultiplexer.

7. The broadcast-and-select optical switching unit of claim 6, wherein the plurality of transceivers convert the output signals from the demultiplexer from optical signals to electrical signals, and convert the signals connected to the multiplexer from electrical signals to optical signals.

8. The broadcast-and-select optical switching unit of claim 7, further comprising:
an electrical Top-of-Rack switch connected to the plurality of transceivers and to one or more servers hosted in a single server rack, wherein the electrical Top-of-Rack switch transmits the converted electrical signals to the one or more servers.

9. The broadcast-and-select optical switching unit of claim 8, wherein the number of transceivers connected to the electrical Top-of-Rack switch less than or equal to the number of servers connected to the electrical Top-of-Rack switch.

10. The broadcast-and-select optical switching unit of claim 5, wherein the demultiplexer separates the third signal into the plurality of second output ports based on their respective wavelengths.

* * * * *